US008210124B2

(12) United States Patent
Tanaka et al.

(10) Patent No.: US 8,210,124 B2
(45) Date of Patent: Jul. 3, 2012

(54) METHOD OF ARTIFICIALLY REARING LOBSTER LARVAE AND REARING APPARATUS

(75) Inventors: Yuji Tanaka, Tokyo (JP); Yoshioki Oozeki, Kanagawa (JP)

(73) Assignees: National University Corporation Tokyo University, Tokyo (JP); Tokyo University of Marine Science and Technology, Tokyo (JP)

( * ) Notice: Subject to any disclaimer, the term of this patent is extended or adjusted under 35 U.S.C. 154(b) by 0 days.

(21) Appl. No.: 12/740,900

(22) PCT Filed: Oct. 20, 2008

(86) PCT No.: PCT/JP2008/068954
§ 371 (c)(1),
(2), (4) Date: Jul. 9, 2010

(87) PCT Pub. No.: WO2009/057472
PCT Pub. Date: May 7, 2009

(65) Prior Publication Data
US 2010/0282176 A1 Nov. 11, 2010

(30) Foreign Application Priority Data
Nov. 1, 2007 (JP) .................................. 2007-285222

(51) Int. Cl.
*A01K 61/00* (2006.01)
(52) U.S. Cl. ........................................ 119/204; 119/206
(58) Field of Classification Search .................. 119/204, 119/205, 206, 207, 200, 210
See application file for complete search history.

(56) References Cited

U.S. PATENT DOCUMENTS

| 3,696,788 A * | 10/1972 | Day et al. ...................... 119/205 |
| 2006/0042556 A1 * | 3/2006 | Hsiao ............................. 119/204 |
| 2007/0204799 A1 * | 9/2007 | Okamoto ........................ 119/204 |

FOREIGN PATENT DOCUMENTS

| JP | 3-91429 | 4/1991 |
| JP | 2525609 | 5/1996 |
| JP | 2002-262702 | 9/2002 |
| JP | 2004-097070 | 4/2004 |

OTHER PUBLICATIONS

"Picture of the Week: Lobster Phyllosoma Larvae—(Palinuroidea)," Image Quest 3-D, available at http://web.archive.org/web/200011190343/http://www.imagequest3d.com/pages/current/pictureoftheweek/phyllosoma/phyllosoma.htm (2000).*

(Continued)

*Primary Examiner* — Rob Swiatek
*Assistant Examiner* — Lisa Tsang
(74) *Attorney, Agent, or Firm* — Staas & Halsey LLP

(57) ABSTRACT

A method of artificially rearing lobster larvae, in which lobster larvae of the Palinuridae and Scyllaridae families are guided toward jellyfish so that the lobster larvae parasitize the jellyfish and grow on the host jellyfish. An apparatus for rearing lobster larvae wherein a symbiotic feeding tank (1), in which the larvae are reared in the state of being parasitic on the jellyfish, and a jellyfish rearing tank (2) are connected together via a pipe (3), through which water and the jellyfish are supplied from the jellyfish rearing tank (2) to the symbiotic feeding tank (1), and the pipe (3) is provided with a switching valve (7).

3 Claims, 3 Drawing Sheets

OTHER PUBLICATIONS

"Lobster Phyllosoma Larva riding Lovenella Medusan," Image Quest Marine, available at http://web.archive.org/web/20010305223251/http://imagequest3d.com/pages/2dplankton/images/hires/phyly.htm (2001).*

Kunzig, Robert, "At Home With the Jellies," Discover Magazine, available at http://discovermagazine.com/1997/sep/athomewiththejel1216 (1997).*

Herrnkind et al., "A further note on phyllosoma larvae associated with medusae," Bulletin of Marine Science, 26:1 (1976).*

International Search Report issued Jan. 13, 2009 in International Application No. PCT/JP2008/068954.

Jiro Kittaka, "Jellyfish as Food Organisms to Culture Phyllosoma Larva", Bulletin of the Plankton Society of Japan, 2005, vol. 52, No. 2, pp. 91-99.

Hirokazu Matsuda, "Studies on the Larval Culture and Development of Panulirus Lobsters", Bulletin of the Japanese Society of Fisheries Science, 2006, vol. 72, No. 5, pp. 827-830.

Abstracts for the Annual Meeting of the Japanese Society of Fisheries Science, National Research Institute of Fisheries Science, Fisheries Research Agency, 2005.

Chinese Office Action for corresponding Chinese Patent Application No. 2011122000267300 dated Dec. 23, 2011.

Marine Science Bulletin, vol. 18, No. 5, Oct. 1999, 4 pgs.

Shojima, "Scyllarid Phyllosomas' Habit of Accompanying the Jelly-Fish", Bulletin of Japanese Society of Scientific Fisheries, vol. 29, No. 4, 1963, 3 pages (in English).

* cited by examiner

METHOD OF ARTIFICIALLY REARING LOBSTER LARVAE AND REARING APPARATUS

CROSS REFERENCE TO RELATED APPLICATIONS

This application claims the benefit under 35 U.S.C. Section 371, of PCT International Application Number PCT/JP2008/068954, filed Oct. 20, 2008 and Japanese Application No. 2007-285222, filed Nov. 1, 2007 in Japan, the contents of which are incorporated herein by reference.

FIELD OF THE INVENTION

The present invention relates to a method and apparatus for artificially rearing lobster larvae belonging to the Palinuridae and Scyllaridae families.

BACKGROUND

After hatching from eggs, lobsters spend a certain period of time as larvae. For example, spiny lobsters spend approximately one year as phyllosoma larvae, then metamorphose into puerulus/nisto larvae, and then metamorphose into juvenile lobsters. Since lobsters are relatively expensive, high in demand, and important aquatic resources, there is a high need for a technology for producing a large amount of lobster seeds and seedlings in a stable manner. It is difficult, however, to artificially feed and rear phyllosoma larvae. At present, they are only grown in unit of several individuals in small tanks in the field of fisheries experimental research.

Reasons why phyllosoma larvae are difficult to artificially rear include: (a) appropriate baits are limited; (b) the larvae are likely to sink to the bottom of the tank and prone to microbial contamination by feces and uneaten baits present on the bottom of the tank; and (c) their peculiar shape is easily broken by interference between individuals. In a known method of artificially rearing spiny lobster larvae, the first-stage phyllosoma larvae of spiny lobsters are fed with *Artemia nauplii* and in the second and following stages are fed with *Artemia nauplii* and pieces of mussel meat, in particular gonads of blue mussel (see Japanese Patent No. JP 2525609, and Hirokazu Matsuda, "Studies on the larval culture and development of Panulirus lobsters", Nippon Suisan Gakkaishi, The Japanese Society of Fisheries Science, 2006, vol. 72 (5), pp. 827-830). It is not practical, however, to adopt this method to artificially rear a large number of larvae, because it is difficult to collect a large number of fresh blue mussel gonads on a regular basis.

In other known methods, crustacean larvae are reared in slowly rotating tanks to prevent the larvae from sinking (see Japanese Unexamined Patent Publication No. JP 2002-262702 and Japanese Patent No. JP 3955947). These methods have a disadvantage of high rearing cost, because they rely on complicated and expensive apparatus. Furthermore, no technology has been developed so far to keep individual larvae apart from each other with more than a certain distance between them.

SUMMARY OF THE INVENTION

The present invention aims to provide a method and apparatus for artificially rearing lobster larvae to enable high-density rearing of lobster larvae by feeding them with suitable baits, protecting them from being damaged by interference between individuals, and preventing the larvae from sinking to the bottom of a feeding tank.

In the natural world, phyllosoma larvae of lobsters belonging to the Palinuridae and Scyllaridae families are found on the umbrellas of jellyfish, usually one phyllosoma larva parasitizing one umbrella. In addition, a finding that jellyfish was included in the contents of digestive organs of phyllosoma larvae of spiny lobsters was reported in the Abstracts for the Annual Meeting of the Japanese Society of Fisheries Science 2005 (published on Apr. 1, 2005 by National Research Institute of Fisheries Science, Fisheries Research Agency). From these findings, it is assumed that a symbiotic relationship, including the predator-prey relationship, exists between phyllosoma larvae and jellyfish.

Focusing on this, the applicant has developed a method and apparatus for artificially rearing lobster larvae at high density. The novel method of artificially rearing lobster larvae guides lobster larvae of the Palinuridae and Scyllaridae families toward jellyfish so that the lobster larvae parasitize the jellyfish and grow on the host jellyfish. Preferably, the jellyfish parasitized by the lobster larvae are replaced at certain intervals of time with new, vigorous jellyfish having a suitable size according to the stage of growth of the larvae. Preferably, the lobster larvae are guided toward the jellyfish under illumination with white light. The lobster larvae may be phyllosoma larvae.

The novel apparatus for artificially rearing lobsters includes a symbiotic feeding tank for rearing the larvae on the host jellyfish and a jellyfish rearing tank. These two tanks are interconnected by a pipe for supplying water, together with jellyfish, from the jellyfish rearing tank to the symbiotic feeding tank. A switching valve is provided in the pipe. The vicinity of the water inlet that introduces water from the pipe to the symbiotic feeding tank may be illuminated with white light.

According to the present invention, a large number of lobster larvae can be reared at a high survival rate without additional baits, without being infected with microorganisms on the bottom of the feeding tank, and without being damaged by contact between individual larvae, because their host jellyfish are natant and individual jellyfish stay afloat a certain distance away from each other without interfering each other and thus the larvae parasitizing these jellyfish can feed on the host jellyfish and stay afloat with the host jellyfish with a certain distance away from each other.

BEST MODE FOR CARRYING OUT THE INVENTION

Example

Figure 1:
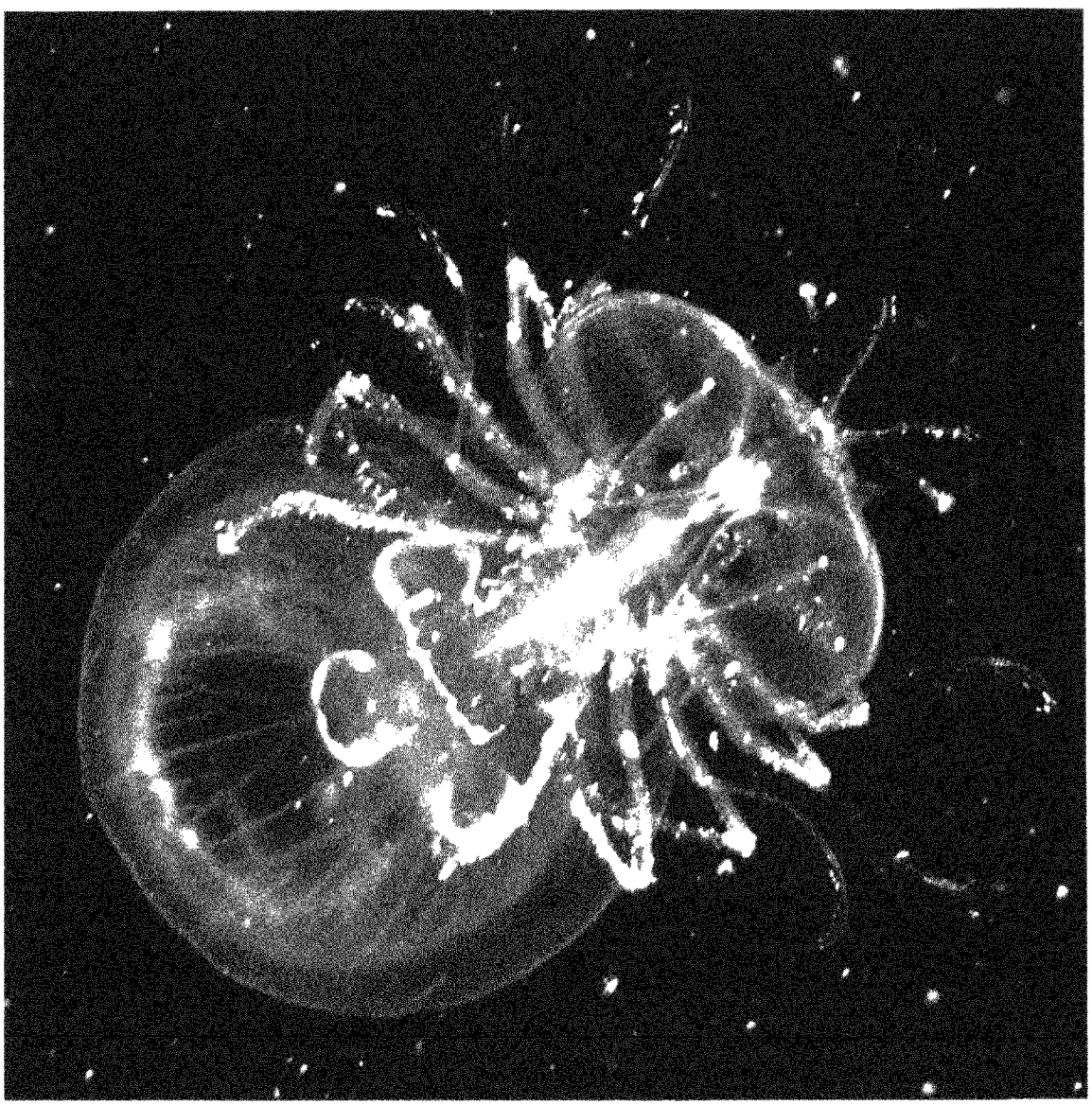
FIG. 1 is a top view of a phyllosoma larva symbiotic with a moon jellyfish.
Figure 2:
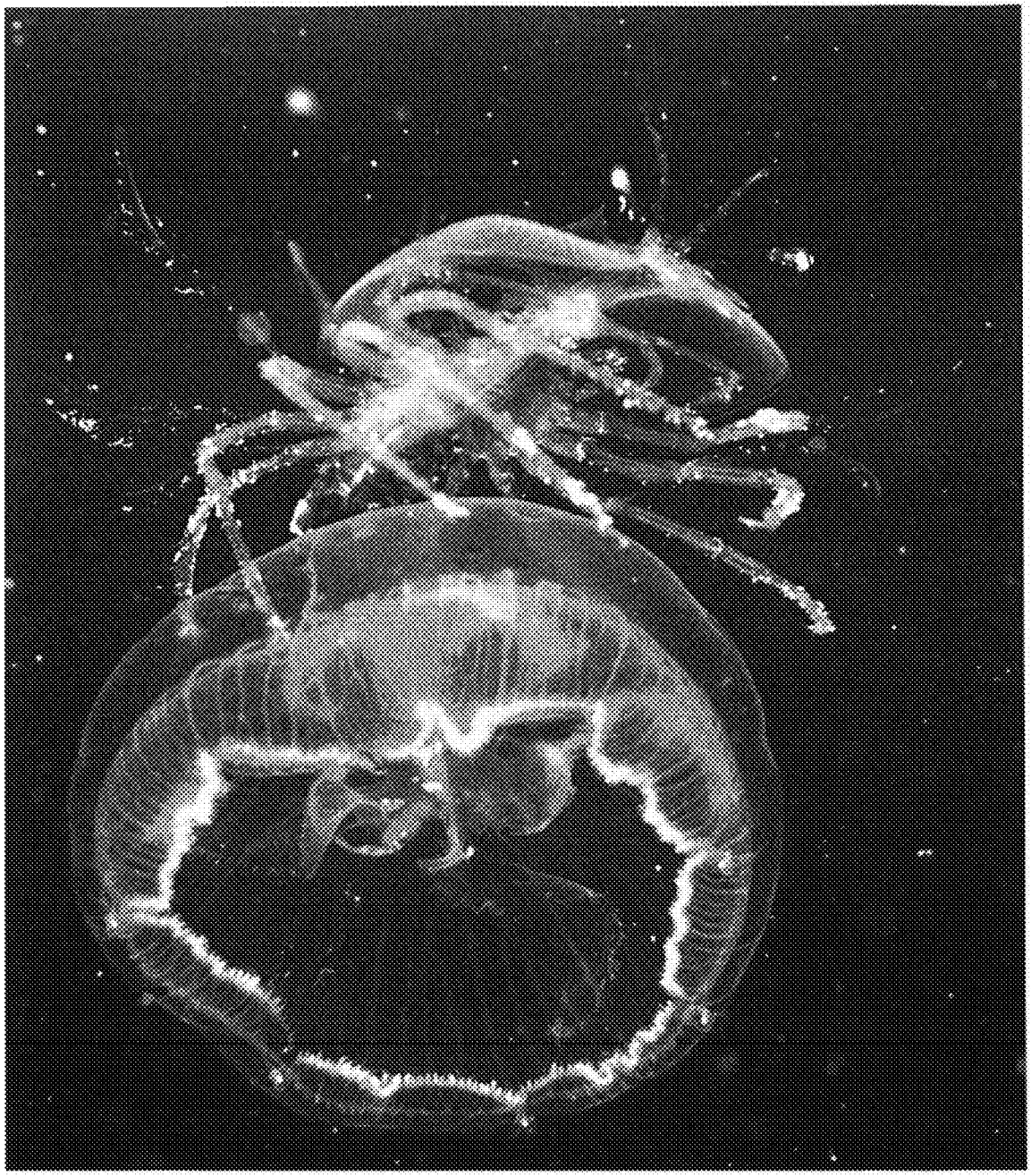
FIG. 2 is a perspective view, viewed from below, of a phyllosoma larva symbiotic with a moon jellyfish.

A phyllosoma larva parasitizing a moon jellyfish was captured off the Izu Osezaki beach. As shown in FIGS. 1 and 2, the phyllosoma larva was clinging to the umbrella of the moon jellyfish with its appendage tips apparently piercing the umbrella. The captured phyllosoma larva and moon jellyfish were put into a cylindrical symbiotic feeding tank made of transparent acrylic of 30 cm in inner diameter and 80 cm in height. The tank was filled with filtered seawater with salinity of 34.5% and kept at a water temperature of 20° C.

The moon jellyfish captured together with the phyllosoma larva in the natural water area gradually deteriorated although it was still vigorous. The applicant, therefore, tried to cause the phyllosoma larva to migrate from the deteriorated moon jellyfish to a fresh moon jellyfish. When white light was guided from a metal halide cold light source through an optical fiber toward the symbiotic feeding tank and transmitted downward through the surface of the water in the tank, the phyllosoma larva on the jellyfish slowly moved upwards while holding the jellyfish. When the phyllosoma larva reached near the surface of the water, a new moon jellyfish was gently transferred from the jellyfish rearing tank to an upper layer of the water in the symbiotic feeding tank. Then, the phyllosoma larva spontaneously left the deteriorated moon jellyfish and migrated to the fresh moon jellyfish. The deteriorated moon jellyfish abandoned by the phyllosoma larva gradually sank to the bottom of the symbiotic feeding tank and was siphoned out of the tank.

Fresh moon jellyfish individuals were regularly captured in Tokyo Bay and stockpiled in the jellyfish rearing tank as needed. The phyllosoma larva was transferred to a fresh moon jellyfish every three to seven days. The phyllosoma larva symbiotic with the moon jellyfish picked and ate only the moon jellyfish, then molted and metamorphosed three weeks later into puerulus (nisto larva), which is popularly known as "glass lobster", and started to live on the bottom. This phyllosoma larva was identified as a large-toothed sand crayfish (*Ibacus novemdentatus*).

Figure 3:
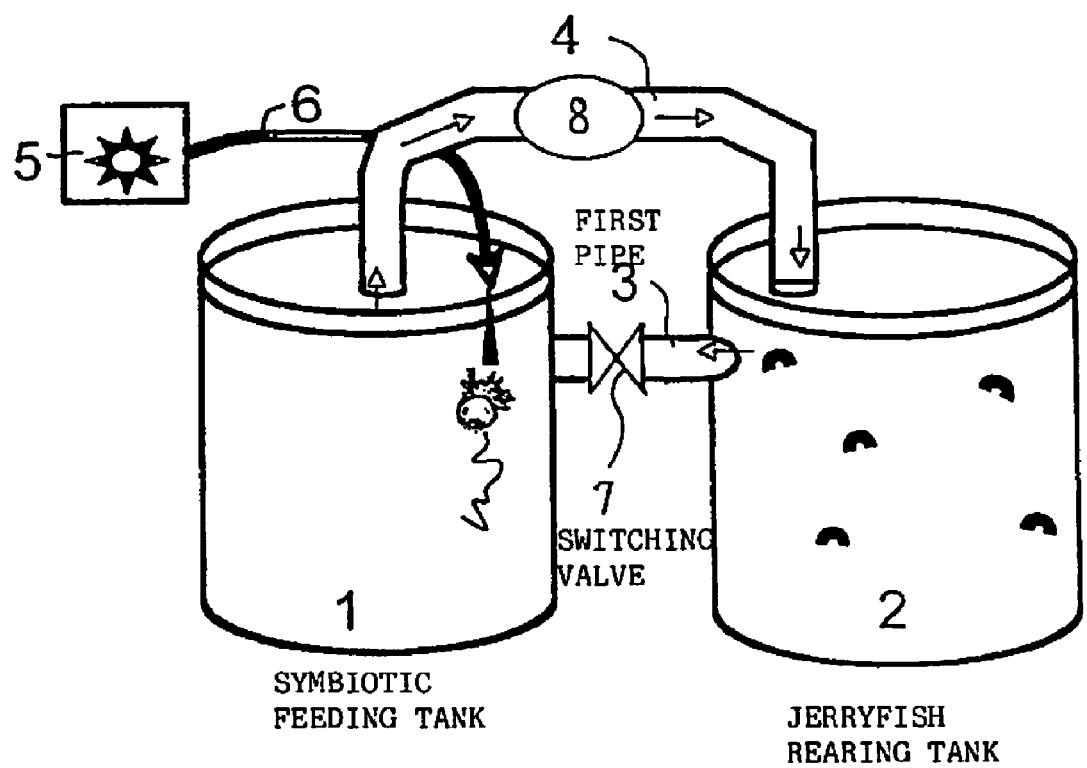
FIG. 3 is a perspective view of a rearing apparatus representing an embodiment of the present invention.

To rear a large number of phyllosoma larvae and jellyfish industrially, newly hatched phyllosoma larvae are calmly introduced into a jellyfish rearing tank in which seawater is slowly convecting and the phyllosoma larvae are left to ride on the jellyfish spontaneously. The number of larvae introduced is approximately the same as the number of jellyfish individuals introduced. As the jellyfish parasitized by the phyllosoma larvae deteriorate or the larvae molt and grow, the larvae should be transferred from the deteriorated jellyfish to fresh vigorous jellyfish having a suitable size according to the stage of growth of the larvae, so a rearing apparatus as shown in FIG. 3 is employed to rear phyllosoma larvae symbiotic with jellyfish.

This rearing apparatus includes a symbiotic feeding tank 1 and a jellyfish rearing tank 2, which are disposed parallel to each other. The upper portions of the symbiotic feeding tank 1 and the jellyfish rearing tank 2 are interconnected by a first pipe 3 and a second pipe 4, which are approximately 80 mm in inner diameter. A switching valve 7 is provided in the first pipe 3, and a pump 8 is provided in the second pipe 4. A metal halide cold light source 5 or other light source is also provided so that white light can be guided through an optical fiber 6 toward the vicinity of the upper portion of the symbiotic feeding tank 1 connected to the first pipe 3 and a white light beam can be transmitted downward through the surface of the water.

The phyllosoma larvae riding on the jellyfish are introduced into the symbiotic feeding tank 1, while jellyfish a little larger than these jellyfish are put into the jellyfish rearing tank 2. Then, with the switching valve 7 closed, the pump 8 is operated to supply the seawater from the symbiotic feeding tank 1 to the jellyfish rearing tank 2 through the second pipe 4 until the water level in the symbiotic feeding tank 1 is lowered than the water level in the jellyfish rearing tank 2. The switching valve 7 in the first pipe 3 is then opened to send fresh jellyfish individuals one by one, together with the seawater, from the jellyfish rearing tank 2 to the symbiotic feeding tank 1 through the first pipe 3.

To guide the phyllosoma larvae to the seawater inlet from the first pipe 3, the symbiotic feeding tank 1 is illuminated with the white light from the optical fiber 6, because the phyllosoma larvae are photopositive. With this, the phyllosoma larvae are prompted to migrate from the deteriorated jellyfish to fresh jellyfish. The old jellyfish parasitized and deteriorated by the larvae sink to the bottom of the symbiotic feeding tank 1 and are siphoned out of the symbiotic feeding tank 1.

A newly hatched spiny lobster larva (phyllosoma) has a size of approximately 1.5 mm and grows up to approximately 30 mm. The moon jellyfish has an umbrella of approximately 5-50 mm in diameter. Since the moon jellyfish can be reared at a density of 5 individuals (umbrella diameter 50 mm) to 50 individuals (umbrella diameter 5 mm) per litter of seawater, as many as 5-50 phyllosoma larvae can be reared per liter of seawater. The phyllosoma larvae should be transferred to fresh jellyfish about once a month, although it slightly varies with the type of lobster.

The crab larvae belonging to the Majidae and Cancer families are also symbiotic with jellyfish, so it is considered that these crab larvae can be reared in a similar rearing method using the same rearing apparatus as the one used for the lobster larvae. It is also possible to keep the host jellyfish in vigor by feeding them with baits.

What is claimed is:

1. A method of artificially rearing a lobster larva belonging to Palinuridae or Scyllaridae families in water, wherein the lobster larva is guided to migrate from a first jellyfish to a second jellyfish by transmitting white light towards a surface of the water and by introducing the second jellyfish into the water when the lobster larva approaches the surface of the water.

2. The method according to claim 1, wherein a source of the white light is located above the surface of the water and the white light is transmitted downwards towards a surface of the water.

3. The method according to claim 1, wherein the second jellyfish is introduced into the water near an upper layer of the water.

* * * * *